United States Patent [19]

Lent et al.

[11] Patent Number: 5,316,575
[45] Date of Patent: May 31, 1994

[54] PIGMENTED, LOW VOLATILE ORGANIC COMPOUND, INK JET COMPOSITION AND METHOD

[75] Inventors: Bruce A. Lent, Oak Park; Adrian M. Loria, Wilmette, both of Ill.

[73] Assignee: Videojet Systems, International, Inc., Wood Dale, Ill.

[21] Appl. No.: 958,267

[22] Filed: Oct. 8, 1992

[51] Int. Cl.⁵ ............................................. C09D 11/02
[52] U.S. Cl. .............................. 106/20 R; 106/20 D; 106/30 R
[58] Field of Search ............... 106/20 R, 20 D, 30 R

[56] References Cited

U.S. PATENT DOCUMENTS

| | | | |
|---|---|---|---|
| 4,072,644 | 2/1978 | Hedrick | 524/548 |
| 4,137,083 | 1/1979 | Hedrick | 106/20 R |
| 4,963,188 | 10/1990 | Parker | 106/20 R |

*Primary Examiner*—Helene Klemanski
*Attorney, Agent, or Firm*—Leydig, Voit & Mayer, Ltd.

[57] ABSTRACT

An ink composition suitable for ink jet printing operations comprising an aqueous resin solution and an organic pigment where said ink composition is substantially free of volatile organic compounds. Compositions are provided that form printed images that are solvent resistant to with isopropanol, ethanol, water, and mixtures thereof, and are retortable.

8 Claims, No Drawings

PIGMENTED, LOW VOLATILE ORGANIC COMPOUND, INK JET COMPOSITION AND METHOD

FIELD OF THE INVENTION

The present invention relates to ink jet printing compositions and, more particularly, to ink jet printing compositions that adhere to nonporous substrates and have reduced levels of volatile organic compounds.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed image on that surface. This technique of noncontact printing is particularly well-suited for application of characters onto irregularly shaped surfaces, including, for example, the bottom of beverage containers.

In general, an ink jet composition must meet certain rigid requirements to be useful in ink jet printing operations. These relate to viscosity, resistivity, solubility, compatibility of components and wetability of the substrate. Further, the ink must be quick-drying and smear resistant, must be capable of passing through the ink jet nozzle without clogging, and must permit rapid cleanup of the machine components with minimum effort.

Many of the surfaces on which ink jet printing is utilized are nonporous, such as the above-mentioned beverage container. The ink used for these applications must adhere well to the nonporous substrate and normally must be water-resistant. Presently used ink for such applications conventionally contains a resin, a dye, a carrier, and other components.

Heretofore, to obtain satisfactory adhesion of a water-resistant ink jet composition to a nonporous substrate, it has been necessary to use an organic solvent as the carrier to dissolve the resin and/or the dye. For example, U.S. Pat. No. 4,260,531 discloses an ink jet printing composition comprising a styrene-acrylic copolymer resin, a dye, and a mixture of water and one or more watermiscible $C_1$-$C_3$ alcohols as the diluent. U.S. Pat. No. 4,246,154 discloses an ink jet printing composition comprising an aqueous vinyl polymer suspension which is added to a solution of a hydrophobic dye previously dissolved in an organic solvent.

Use of these organic solvents poses toxicity and flammability problems for the ink jet formulator. However, the use of organic solvents is undesirable for an additional reason—they pose an environmental hazard. After the ink has been applied to the substrate, the solvent evaporates, releasing organic compounds into the atmosphere. These volatile organic compounds adversely affect the environment in the atmosphere and are the subject of both federal and state governmental regulations.

Volatile organic compounds, also known as VOC, are defined as any compound of carbon that evaporates from a paint or coating film under specific test conditions. The amount of volatile organic compounds, present in a given composition in grams per liter of coating can be determined by using the following formula:

$$VOC\ (g/l) = \frac{W_s - W_w - W_{es}}{V_m - V_w - V_{es}}$$

where $W_s$ is the weight of volatile compounds in grams;
$W_w$ is the weight of water in grams;
$W_{es}$ is the weight of exempt compounds in grams;
$V_m$ is the volume of material in liters;
$V_w$ is the volume of water in liters; and
$V_{es}$ is the volume of exempt compounds in liters.

In the above formula, exempt compounds are volatile organic compounds whose use is specifically sanctioned by regulatory agencies. Trichloroethane is an example of an exempt compound.

The maximum acceptable level of volatile organic compounds varies for different coating applications and from state to state. For example, in California the maximum acceptable level of volatile organic compounds set for the aerospace coatings industry is 340 grams/liter. However, until the present invention, there was no pigmented ink jet composition that met any of the government standards and still had the qualities necessary for satisfactory use in ink jet printing operations on nonporous substrates.

U.S. Pat. No. 4,334,878 and Defensive Publication No. T 102,701 disclose ink jet compositions comprising a water-soluble dye, an ammonia soluble acrylic binder, and ammonium hydroxide. Japanese publication 63-213583 relates to a general printing ink that employs an alkali-soluble resin, along with an alkaline reagent, in combination with a pigment.

Copending U.S. application Ser. No. 07/692,300, by the same inventors as the present application, relates to an ink composition suitable for ink jet printing operations comprising an aqueous resin dispersion and an aqueous colorant where said ink composition is substantially free of volatile organic compounds. Such formulations have been found to give suitable results when the colorant is a dye, but uniformly satisfactory results have not been achieved when use is made of an organic pigment as the coloring agent. Further, when dyes are employed as the colorant, a natural limitation based upon the solubility of the dye in the formulation is reached, that may not provide sufficient coloration for specific applications.

From the foregoing it is clear that a general need exists for a substantially volatile organic compound-free ink jet composition that contains organic pigments as the colorant, adheres to nonporous substrates, and is water-resistant, as well as for an ink jet composition which poses minimal toxicity and flammability problems, while being easily disposable by the formulator and end user. A specific need also exists for such an ink jet composition suitable for use in ink jet printing operations on nonporous substrates which has a volatile organic compound level less than 500 grams/liter, preferably less than 340 grams/liter. Although such needs in the art have existed for years, no practical solution has yet been found.

Certain specialized application needs also exist which remain unfilled present-day ink jet formulations. In many instances, printed images formed from the ink jet printing operation are printed onto substrates which must be sterilized, as through steam sterilization. For such applications, the ink jet formulation must be capable of forming printed images that remain substantially unaffected after retorting. Such retortability is especially critical with respect to containers for use in the food industry. Generally, such containers are made of glass or are cans made of tin-free steel ("TFS") or aluminum.

In other instances, the substrate with the printed image thereon must be exposed to aqueous and/or non-aqueous solvent-washing procedures. For such applications the jet ink must be capable of forming printed images that withstand solvents, such as isopropanol, ethanol, water, and mixtures thereof.

Heretofore, pigmented ink jet printing formulations meeting the aforementioned and other needs have not been available, or have been available only in formulations that contain large quantities of volatile solvents. Such needs are now satisfied by the present invention, the description of which follows.

SUMMARY OF THE INVENTION

The present invention provides an ink composition for use in ink jet applications, which is substantially free of volatile organic compounds. The composition utilizes an aqueous resin solution and an organic pigment as the colorant, with substantially no organic solvents. As a result, the toxicity, flammability and disposal problems inherent in the use of organic solvents are avoided. More importantly, the ink composition of the present invention complies with the present government standards for acceptable levels of volatile organic compounds.

Further, the present invention provides colored and black, ink jet compositions that directly, after application to a nonporous substrate, are retortable and resist solvents such as isopropanol, ethanol, water and mixtures thereof. Additionally, the present invention provides pigmented ink jet compositions that may be printed onto porous and nonporous substrates.

DETAILED DESCRIPTION OF THE PREFERRED EMBODIMENTS

As described hereinabove, the ink compositions of the
present invention comprise an aqueous resin solution, an organic pigment, water, and other optional components which may be present in carefully balanced proportions to achieve preferred operation of the ink in an ink jet printing apparatus.

In one embodiment, the present invention provides an ink composition suitable for ink jet printing onto a non-porous surface to form printed images, as on glass, tin-free steel and aluminum, capable of being retorted, without prior heat curing and being capable of being washed with water, isopropanol, ethanol, or mixtures thereof, without substantial degradation of the printed images, said composition comprising an aqueous resin that is soluble in water at a basic pH and insoluble at acidic pH, said composition being substantially free of volatile organic compounds.

The present invention also provides a method of forming sterilized, printed images, on a nonporous substrate, such as glass, tin-free steel and aluminum, comprising printing onto said substrate, by ink jet printing, a jet ink comprising an aqueous resin that is soluble in water at a basic pH and insoluble at an acidic pH, said composition being substantially free of volatile organic compounds and, without prior heat curing, retorting of said substrate.

In addition, there is provided a method of forming solvent-washed, printed images, on a nonporous substrate, such as glass, tin-free steel and aluminum, comprising printing onto said substrate, by ink jet printing, a jet ink comprising an aqueous resin that is soluble in water at a basic pH and insoluble at an acidic pH, and an organic pigment, said composition being substantially free of volatile organic compounds and, without prior heat curing, washing the printed substrate with a solvent selected from the group consisting of ethanol, isopropanol, water and mixtures thereof.

In general, the ink compositions of the present invention exhibit the following characteristics for use in ink jet printing systems: (1) a viscosity from about 1.6 to about 7.0 centipoises at 25° C.; (2) an electrical resistivity from about 50 to about 2000 ohm-cm; and (3) a sonic velocity from about 1200 to about 1300 meters/second.

The inks dry within about 4–10 seconds, with good adhesion when printed on nonporous substrates, such as bare tinplate, aluminum, polymeric-coated tin or aluminum, or polymeric-coated tin cans, TFS, glass, or aluminum.

The ink compositions of the present invention may also be used for graphic applications on porous substrates such as paper, glossy paper, Tyvek ® envelopes, corrugated cardboard and other graphic paper products. Additionally, where carbon black is used as the colorant, the ink composition of the present invention can be used to print bar codes that can be scanned visually or by infrared (IR) spectroscopy.

The ink compositions of the present invention are, as indicated, also substantially free of volatile organic compounds. To be substantially free of volatile organic compounds (VOC), the ink composition should be formulated so that it has a volatile organic compound level of less than 500 grams/liter. Preferably, the ink compositions of the present invention have a volatile organic compound level of less than 340 grams/liter, with a volatile organic compound level of 300 grams/liter or less being most preferred.

THE RESIN

Suitable aqueous resins for use in the ink compositions of the present invention must meet certain requirements. The improved ink jet printing of the invention employs inks containing as binders polymers which have unesterified free carboxyl groups along their chains; for example, polymers or copolymers of acrylic or alkyl acrylic acids. In accordance with one aspect of the invention, these polymers are soluble in basic solutions of water. In accordance with a related aspect of the invention, where the solubilizing base is volatile, for example, ammonia obtained from a source such as ammonium hydroxide, ammonium carbonate, morpholine or the like, after drying, and removal of base by evaporation, the polymer is insoluble in water and alcohol, and is resistant to removal by abrasion.

The acrylic polymer may be of any of a number of known polymers of acrylic or lower alkyl acrylic which have a plurality of carboxyl groups and which are soluble in basic ammonia water solutions. Such materials are commercially available as PHOPLEX B-336 of the Rohm and Haas Company; BRIGHT PLATE 23 and JONCRYL of S. C. Johnson and Sons, Inc.; and as CARBOSET resins from the B. F. Goodrich Chemical Co. While higher molecular weight materials can be employed, low to moderate molecular weights are preferred to obtain higher polymer content in the low viscosity inks.

The carboxylic acid group is an active group capable of being solubilized in the ink as by a fugitive amine such as ammonia. The other binder constituent is a compound of a group such as styrene which helps insolubilize the copolymer of acrylic acid once the ink is printed and some of the pH adjusting agent is driven off.

A copolymer of styrene and acrylic acid of a molecular weight of about 10,000, and having a styrene to acrylic acid proportion by weight of about 2 to is most preferred. Once such binder is Joncryl 67, a styrenated acrylic from S. C. Johnson Co. While Joncryl 67 represents the preferred binder component, other water saponifiable, styrene-acrylic acid or alkyl acrylate acid polymer can be used. The amount of such resinous binder can be varied within the range of about 5 to 20% by weight of the ink composition, but it is preferred to make use of an amount within the range of about 10 to about 15%, by weight of the ink composition.

Other specific resins believed to be suitable in the inks of the present invention include Joncryl 682, 50, 57, 60, 134, and 142, styrene/acrylic resins, manufactured by Johnson Wax S. C., Johnson & Johnson, Inc.; Lucidene styrene/acrylic resin manufactured by Morton Chemical Co. a division of Morton Norwich Products Inc.; Roplex AC-417, AC-829, and AC-64 styrene/acrylic resin manufactured by Rohm and Haas Co.; PVP K 15, polyvinyl pyrrolidone manufactured by GAF Chemicals; Pentalyn 261, Dresinol 210 B. Natrosol, and Klucel rosin derivatives manufactured by Hercules Inc.; Scripset 550, modified polystyrene manufactured by Monsanto Co.; and Meoprene Latex 115, synthetic rubber manufactured by Du Pont. "In a preferred embodiment the resin is present in an amount from about 20 weight percent to about 60 weight percent, based on the total weight of the composition."

THE pH ADJUSTING AGENTS

It is important to include a basic reagent in the ink composition to insure that the resinous binders remain soluble throughout the range of water content and throughout the period of storage and use. For this purpose, it is desirable to maintain the pH of the ink at about 7.0-10.5, e.g., about 7.5 and 10. The pH is dependent upon the particular resin and other components which are employed. Although use can be made of inorganic bases such as sodium hydroxide and potassium hydroxide, their presence in the printed character leads to poor water resistance after drying. It is preferred to make use of an organic base which can be eliminated by evaporation. Best use is made of a pH adjusting agent that evaporates rapidly to accelerate development of water resistance upon aging. Thus, while use can be made of organic amines, it is preferred to make use of ammonium hydroxide for controlling pH within the desired range. Morpholine can also be used for long term stability during storage of the ink composition.

Because ammonium hydroxide is also an ionizable material, it is also capable of imparting conductivity to the ink, bringing the resistivity down below 2000 ohm-cm and into the operating range for proper ink drop charging for jet printing.

THE PIGMENTS

The pigment particles in the dispersion should be uniform in size, with a particle size from about 0.01 to about 1.0 microns and should be stable in dispersion. Dispersion properties should remain constant at temperatures up to about 120° F., and the dispersion should not show any sedimentation for at least 18 months. There should additionally be no agglomeration of pigment particles in the dispersion.

As indicated, one of the organic pigments useful in the present invention is carbon black, which is commercially available in a pigment dispersion as Black Acroverse Dispersion #32B32D from Penn Color.

Examples of other organic pigments useful in the present invention are those pigments listed in Table 1 below.

TABLE 1

| COLOR INDEX NUMBER | PRODUCT NAME |
|---|---|
| Pigment Yellow 14 | FLEXO PLUS Yellow Paste WY-7714 |
| Pigment Yellow 14 | FLEXO PLUS Yellow Paste WY-7724 |
| Pigment Yellow 14 | FLEXO PLUS Yellow Paste WY-7784 |
| Pigment Orange 46 | FLEXO PLUS Orange Paste WO-7783 |
| Pigment Red 49 | FLEXO PLUS Red Paste WR-7789 |
| Pigment Blue 15:3 | FLEXO PLUS Blue Paste WB-7785 |
| Pigment Blue 15:3 | FLEXO PLUS Blue Paste WB-7715 |
| RBH Dispersion, Inc. | Calcium Lithol CI #15630.2 |
| RBH Dispersion, Inc. | Lithol Rubine CI #15850.1 |
| RBH Dispersion, Inc. | Alkali Blue CI #42765.1 |
| RBH Dispersion, Inc. | Phthalo Blue CI #74260 |
| RBH Dispersion, Inc. | Diarylide Yellow CI #21108 |

In general, an aqueous pigment dispersion should be present in the ink composition in an amount from about 5% to about 20% by weight of the composition.

THE CARRIER

Water is used as the carrier for the aqueous solution resin and the aqueous colorant in the ink compositions of the present invention. Typically, water is present in an amount from about 40% to about 80% by weight of the ink composition, preferably from about 75% to about 85%.

The resins in the inks of the present invention are believed to be present as true solutions. However, colloidal solutions may be used if filterable without substantial separation through a filter having a pore size substantially smaller than the printer capillary tube, for example through a filter having a pore size of about one micron.

OPTIONAL CURING

Curing may optionally be used to increase solvent resistance. Curing may be accomplished under noncritical curing conditions. Typically, curing temperatures will be from about 100° C. to about 1 60° C., preferably from about 125° C. to about 150° C., and curing times will be from about 15 seconds to about 60 seconds, preferably from about 30 seconds to about 60 seconds. A general cure condition is about one minute at about 150° C. The temperature at which the heat curing occurs is not critical, nor is the time of curing. Obviously, the length of the cure time will vary with the cure temperature. The only requirement is that the curing conditions be such that substantial degradation of the components of the ink jet composition occurs.

OPTIONAL COMPONENTS

Other components may also be included in the ink compositions of the present invention to impart characteristics desirable for ink jet printing applications. These components include defoamers, which improve processing and printer performance. Suitable defoamers include acetylenic diols (commercially available as Surfynol 104 from Air Products and Chemicals, Inc.) and butanol. Small amounts of organic solvents may also be added to improve drying time and reduce surface tension. Suitable solvents include n-methyl-2-pyrrolidone and butanol.

It also may be desirable to add humectants, such as ethylene glycol or propylene glycol methyl ether, to prevent the ink jet tip from drying. Electrolytes can be added to adjust the specific resistivity of the ink. Usable electrolytes include dimethylamine hydrochloride and hydroxylamine hydrochloride. Finally, crosslinking resins, such as melamine resins, may be added to cross link with other polymers to give improved adhesion and increased solvent resistance.

The following examples are illustrative of ink compositions of the present invention.

EXAMPLE I

The following composition was formulated:

| | |
|---|---|
| Lithol Rubine Red Paste (RBH, Inc.) | 12.0% by weight |
| Joncryl 67 resin (20.0% in water) | 50.0% by weight |
| DI Water | 35.8% by weight |
| Surfynol 104 (defoamer) | 0.5% by weight |
| N-methyl 2-pyrrolidone (solvent) | 1.5% by weight |
| Giv Gard DXN | 0.2% by weight |
| | 100.0% by weight |

The resulting ink composition had a viscosity of 4.5 cps, a resistivity of 67 ohm-cm, a pH of 9.13. The jet printed message adhered well to nonporous substrates such as tin plate, glass and plastics. The level of volatile organic compounds present in the ink composition was 132 grams/liter.

EXAMPLE II

The following composition was formulated:

| | |
|---|---|
| Surfynol 104 (1:1 in N-Methyl-2-Pyrrolidone) | 0.5% by weight |
| N-Methyl-2-Pyrrolidone | 1.5% by weight |
| Giv-Gard DXN | 0.2% by weight |
| Water | 45.8% by weight |
| Joncryl 60 | 40.0% by weight |
| Carbon Black Dispersion (Penn Color) | 12.0% by weight |
| | 100.0% by weight |

The resulting ink composition had a viscosity of 4.8 cps, a resistivity of 61 ohm-cm, a pH of 8.6. The jet printed message adhered well to nonporous substrates such as tin plate, glass and plastics. The level of volatile organic compounds present in the ink composition was 120 grams/liter.

EXAMPLE III

The following composition was formulated:

| | |
|---|---|
| Surfynol 104 (1:1 in N-Methyl-2-Pyrrolidone) | 0.5% by weight |
| N-Methyl-2-Pyrrolidone | 1.5% by weight |
| Giv-Gard DXM | 0.2% by weight |
| Water | 39.8% by weight |
| Joncryl 50 | 50.0% by weight |
| Lithol Rubine 98750 (RBH, Inc.) | 8.0% by weight |
| | 100.0% by weight |

The resulting ink composition had a viscosity of 6.15 cps, a resistivity of 67 ohm-cm, a pH of 8.8. The jet printed message adhered well to nonporous substrates such as tin plate, glass and plastics. The level of volatile organic compounds present in the ink composition was 60 grams/liter.

EXAMPLE IV

The following composition was formulated:

| | |
|---|---|
| Surfynol 104 (1:1 in N-Methyl-2-Pyrrolidone) | 0.5% by weight |
| N-Methyl-2-Pyrrolidone | 1.5% by weight |
| Giv-Gard DXM | 0.2% by weight |
| Water | 39.8% by weight |
| Joncryl 57 | 40.0% by weight |
| Alkali Blue 97013 (RBH, Inc.) | 8.0% by weight |
| | 100.0% by weight |

The resulting ink composition had a viscosity of 5.20 cps, a resistivity of 59 ohm-cm, a pH of 8.9. The jet printed message adhered well to nonporous substrates such as tin plate, glass and plastics. The level of volatile organic compounds present in the ink composition was 62 grams/liter.

What is claimed is:

1. An ink composition suitable for ink jet printing operations comprising an aqueous resin solution and an organic pigment, said composition being substantially free of volatile organic compounds, said aqueous resin solution comprising water and a resin that is soluble in water at a basic pH and insoluble in water at an acidic pH, and a sufficient amount of a basic pH adjusting agent to render the resin soluble in the water, the ink composition having the following characteristics for use in ink jet printing systems: (1) a viscosity from about 1.6 to about 7.0 centipoises at 25° C.; (2) an electrical resistivity from about 50 to about 2000 ohm-cm; and (3) a sonic velocity from about 1200 to about 1300 meters/second.

2. The ink composition of claim 1 wherein the resin is present in an amount from about 20 weight percent to about 60 weight percent, based on the total weight of the composition.

3. The ink composition of claim 1 wherein the volatile organic compounds are present in an amount less than about 340 grams/liter.

4. The ink composition of claim 1 wherein the volatile organic compounds are present in an amount less than about 300 grams/liter.

5. The ink composition of claim 1 that is bar code readable.

6. An ink composition suitable for ink jet printing onto a nonporous surface selected from the group consisting of glass, tin-free steel and aluminum, said ink composition comprising an aqueous resin solution comprising water and a resin comprised of a copolymer of styrene and acrylic acid that is soluble in water at a basic pH and insoluble in water at an acidic pH, and sufficient amount of a basic pH adjusting-agent to render the resin soluble in the water, said composition being substantially free of volatile organic compounds, the ink composition having the following characteristics for use in ink jet printing systems: (1) a viscosity from about 1.6 to about 7.0 centipoises at 25° C.; (2) an electrical resistivity from about 50 to about 2000 ohm-cm; and (3) a sonic velocity from about 1200 to about 1300 meters/second, the ink compositions being further characterized by their ability to form printed images on glass, tin-free steel and aluminum that are capable of being retorted, and are capable of being washed with water, isopropanol, ethanol, or mixtures thereof, without substantial degradation of the printed images.

7. A method of forming sterilized, printed images, on a nonporous substrate selected from the group consisting of glass, tin-free steel and aluminum, comprising printing onto said substrate, by ink jet printing, the jet ink of claim 7.

8. A method of forming solvent-washed, printed images, on a nonporous substrate selected from the group consisting of glass, tin-free steel and aluminum, comprising printing onto said substrate, by ink jet printing, the jet ink of claim 6.

* * * * *